May 26, 1964 K. E. MARSTELLER 3,134,319
AIR CONDITIONING APPARATUS
Filed April 13, 1962 2 Sheets-Sheet 1
FIG. 1.
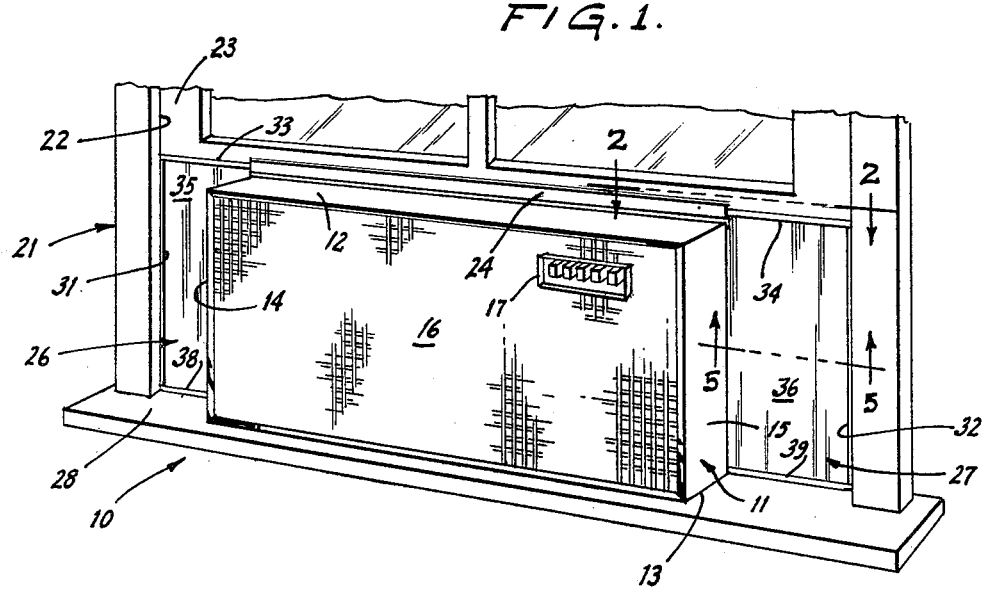
FIG. 2.
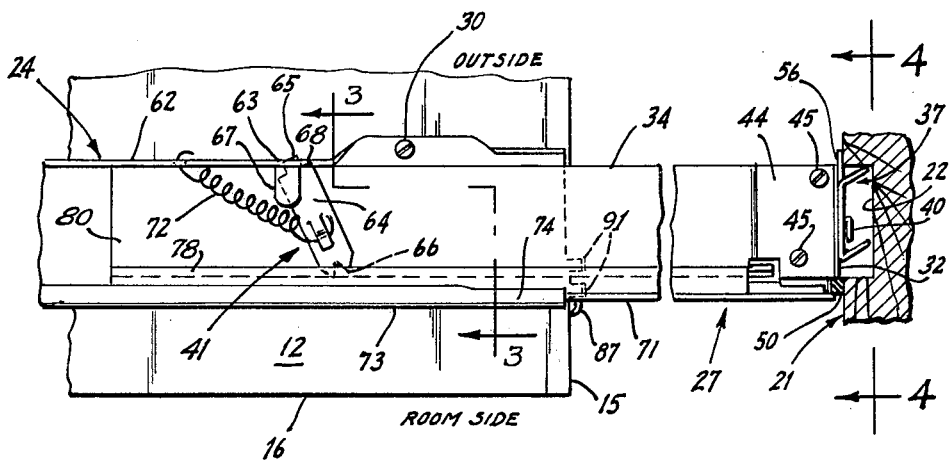
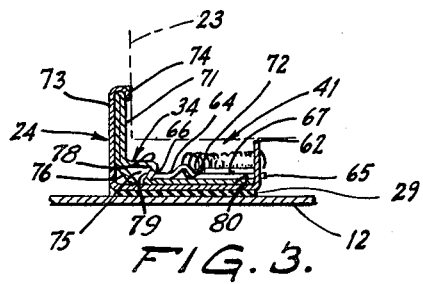
FIG. 3.
INVENTOR.
KENNETH E. MARSTELLER
BY
Harry W. Hargis III
AGENT

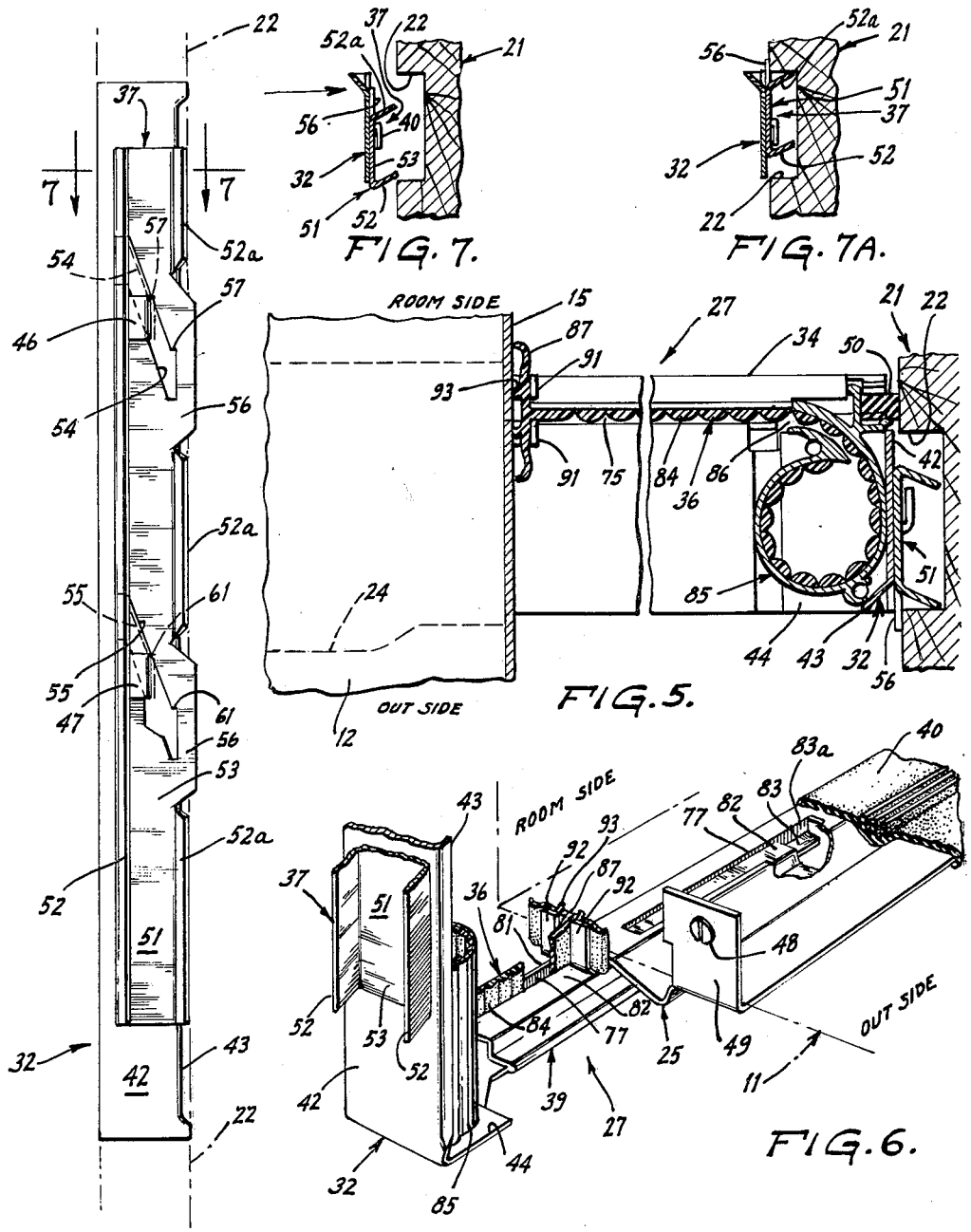

3,134,319
AIR CONDITIONING APPARATUS
Kenneth Edward Marsteller, Willow Grove, Pa., assignor to Philco Corporation, Philadelphia, Pa., a corporation of Delaware
Filed Apr. 13, 1962, Ser. No. 187,350
8 Claims. (Cl. 98—94)

This invention relates to air conditioning apparatus, and more particularly to means for mounting air conditioning apparatus of the room-cooler type within a window opening.

Room-cooler air conditioning apparatus in general comprise box-like housings for air treating and moving means, which housings are mounted within window openings of rooms or spaces to be air conditioned. A housing often is of lesser cross sectional area than the opening so that a window sash is partially closed and rests against the housing, and openings exist to either side of the housing which have to be closed with suitable filler material. It is desirable that the means for mounting the housing includes a suitable sealing arrangement and that it obviate the need for alteration in window construction. It is further desirable that the means for mounting be both easily installed and readily removable.

It is an object of the invention to provide improved means for removably mounting air conditioning apparatus within a window opening.

It is another object of the invention to provide improved means for mounting air conditioning apparatus within a window opening, which means does not require access from out-of-doors.

It is also an objective of the invention to provide means cooperative with the mounting automatically to lock and seal the same upon installation.

It is a further and particular objective of the invention to provide readily adjustable means for mounting a room air conditioner housing within a window opening, which means for mounting includes elements slidable from a retracted position into an extended, window frame-engaging position and is so constructed and arranged that engagement with the window frame actuates locking means for the mounting means to retain the latter in its fully extended position and to lock it to the frame. Extension of the mounting means to its locked position also positions, automatically, means for sealing the openings disposed to either side of the housing between the latter and the window frame.

To the foregoing general ends, and in accordance with a preferred embodiment of the invention, mounting means for a room air conditioner, of the type including a box-like housing adapted for placement within a window frame, comprises: generally rectangular bracket means (see means identified at 27 in the following detailed description) extending transversely of said housing, and adapted for planar disposition within such window frame, said bracket means including a pair of sections adapted for telescoping movement from a retracted position to an extended mounting position engaging such frame; locking means (41) for establishing such extended position and (37) for effecting automatic locking of said bracket means with such window frame in response to interengagement of the frame and bracket means; and panel means (36) coextensible with said bracket means, as it is extended into locking position, effective to seal window openings between said frame and the sides of said housing.

Locking of mounting elements of the bracket means in the window frame is achieved by cam actuated linkage means that is received within and thereupon automatically adjustable to the window channel.

It is a feature of the invention that mounting and locking in place of the air conditioner housing is achieved, automatically, by the mere act of positioning the elements of the mounting means.

For a better understanding of the foregoing as well as additional objects and advantages of the invention, reference is invited to the following description of a preferred embodiment of the invention, taken in light of the accompanying drawing in which:

FIGURE 1 is a perspective view of room air conditioner apparatus mounted within a window opening and embodying the invention;

FIGURE 2 is a plan view, with parts removed and broken away, of mounting structure for the apparatus shown in FIGURE 1, and looking in the direction of arrows 2—2 applied thereto;

FIGURE 3 is a sectional view, with parts removed, taken along the line 3—3 applied to FIGURE 2, and looking in the direction of the arrows;

FIGURE 4 is an elevational view, with parts removed, looking in the direction of arrows 4—4 applied to FIGURE 2;

FIGURE 5 is a sectional view taken along the line 5—5 applied to FIGURE 1 and looking upward in the direction of the arrows;

FIGURE 6 is a perspective view of apparatus seen in the right hand side of FIGURE 1, taken from the outside and with parts removed; and FIGURES 7 and 7A are views of apparatus shown in FIGURE 4, looking in the direction of arrows 4—4 applied thereto, and illustrating operational features of the invention.

With more particular reference to the drawing, and first to FIGURE 1, air conditioning apparatus 10 embodying the invention comprises a box-like housing 11 having a top wall 12, bottom wall 13, end walls 14 and 15, and open front and rear walls. The open front wall is closed by a perforate grille 16. Also, the rear wall opening, which is not shown, is covered by a perforate grille.

The air treating and air moving means of air conditioning apparatus 10 comprises suitable refrigeration, compressor, heat exchanger, fan, and filter elements all of which are mounted according to conventional practice within housing 11, and the perforate grilles over the open front and rear walls provide for room side and outside air circulation into and out of the housing. Control means are preferably arranged, as seen at 17, in the region of the front wall opening for controlling operation of the air treating and moving means. However, while the air treating, and moving means and control means for the same are not shown, and form no part of the present invention, reference may be had to the U.S. Patent No. 3,000,192 of William H. Mullin et al., which discloses and claims one form of such means adapted for disposition in a housing, and which patent is assigned to the assignee of the present invention.

Housing 11 is disposed within a window frame 21 which includes window channels 22 disposed within the plane of the frame. Housing 11 rests upon sill 28 of the frame, and a window sash 23 is slidable within window channels 22 and is shown resting adjacent top wall 12 of housing 11.

With reference also to FIGURES 2 and 6, guide rails 24 and 25 extend along the top and bottom walls 12 and 13, respectively. Generally U-shaped extension frames 26 and 27 each include a vertical or loop member 31 and 32, respectively, at the ends of the frames remote from housing 11. Upper leg portions 33 and 34 are slidable in the upper guide rail 24 (see also FIGURE 3) and lower leg portions 38 and 39 are slidable in lower guide rail 25

(see FIGURE 6) to provide for movements of the extension frames toward and away from housing 11. Flexible panel closure means 35 and 36 extend between the upper and lower extension frame leg portions and between the extension frame vertical members and the housing, and serve to close the openings between end walls 14 and 15 of the housing and window frame 21.

The extension frames and the filler board comprising the closure panel means to either side of the housing are identical insofar as the relative positioning of their elements is concerned, it being understood of course that one frame is adapted for left hand positioning and the other for right hand positioning. For the sake of convenience, details of the locking and closure means of only the right hand mounting structure will be discussed in particular in what follows:

As will be described in more detail with respect to FIGURES 4, 5, 7, and 7A, cam actuated locking means 37 is carried by vertical member 32 and is presented for locking engagement with channel 22 of window frame 21, in response to engagement of elements of the vertical member with the channel upon extending the extension frame 27.

As shown in FIGURES 2 and 3, detent means 41 is mounted on the top guide rail 24 and is adapted resiliently to engage the upper leg 34 of extension frame 27 to hold vertical member 32 of the latter in its locking engagement with window channel 22.

With particular reference to FIGURES 4 and 6, showing vertical member 32 and locking means 37 mounted thereon, the former includes a rigid strap portion 42 having a laterally inclined inwardly presented flange 43 that extends along its outer edge. Inturned tabs 44 (see also FIGURES 2 and 5) at the ends of vertical member 32 are attached by screws 45 (FIGURE 2) to upper and lower leg portions 34 and 39 whereby to form the generally U-shaped frame 27. The material of strap portion 42 is pierced and the resulting rectangular sections are bent up to form lugs 46 and 47 extending upwardly from the outer surface of portion 42.

Locking means 37 comprises channel 51 having vertically extending leg portions 52 and 52a angled laterally as respects the strap portion 42, and a web portion 53 having a pair of parallelly inclined grooves 54 and 55 slidable on lugs 46 and 47, whereby channel 51 is movable, by the force of gravity, diagonally from a retracted upper rest position (FIGURE 7) to an extended lower locking position (FIGURES 2, 4, 5 and 7A), in which position flange 52a of channel 51 is so wedged against the side of the window channel as to lock vertical member 32 in the window channel.

As illustrated in FIGURE 7, movement of channel 51 from its rest position to its locking position is effected by camming engagement of the continuous inclined leg portion 52 with a side wall of window channel 22. Positive frictional engagement (FIGURE 7A) of locking channel 51 after it has been cammed into position, is effected by discontinuous channel leg portion 52a. Dimensions of leg portions 52 and 52a are such that they extend into the window channel 22 part of its depth, while flattened portions 56 extend over surfaces of the window frame adjacent the channels to establish the extended position of frame 27. It will therefore be appreciated that lateral movement of channel 51 is of such a degree as to provide for adjustability of extension frame member 27 to a variety of window channel widths as normally are encountered in window frame structure.

Further, and with particular reference to FIGURE 4, the lower ends of grooves 54 and 55 include offset portions 57 and 61 which cooperate with lugs 46 and 47 to retain channel 51 in its upper retracted position (FIGURE 7, and the broken line showing of FIGURE 4) prior to installation. The offset portions are disengaged from the lugs in response to the lateral initial movement of channel flange 52 upon its camming engagement with the window channel.

With particular reference to FIGURES 2 and 3, mounting structure for detent means 41 includes an upwardly presented flange 62 extending along a rear edge of top guide rail 24 and having a slotted opening 63. A flat pawl or lever 64 includes a tongue portion 65 inserted with clearance into slot 63 and shoulder portion 68 adjacent thereto cooperatively engaging flange 62 to provide for limited pivotal movement of the pawl. The opposite end of the pawl includes friction producing means such as teeth 66. Other than pivotal movements of pawl 64 are prevented by a retainer tab 67 that extends across the latter from flange 62. The upper leg 34 of frame 27 includes an upwardly extending flange 71 disposed along a front edge of the leg and having a Z-shaped section comprising horizontal members 78 and 80 interconnected by a member 79 engaged by teeth 66 of pawl 64. A tension spring 72 extends between the flange 62 and pawl 64, which spring resiliently urges the pawl into frictional locking engagement with member 79 of leg 34. The pawl is so presented diagonally outwardly as automatically to prevent movement of the frame 27 from an extended position to a retracted position, while permitting movements to extended positions. The pawl may be readily released by manually pivoting it out of its locking position, either with the spring in position or removed.

Guide rail 24 has another flange 73 that includes a portion 74 turned down over flange 71 of leg 34, so that tab 67 and flange portion 74 serve as guides for sliding leg 34.

Turning now to the filler panel construction, an upper guide and retainer for the same includes a groove 75 (FIGURES 3 and 5) formed by a reversely bent portion 76 of flange 71 and the Z-section member 79 of the latter. Similarly, a lower retainer and guide for the filler panel comprises a groove 77 (FIGURE 6) formed by a flange 81 of bottom leg 39 and by a reversely bent flange 82 confronting the latter flange 81. The groove 75 serves also as a retainer for guiding lower leg 39 along the flange 83, and its web 83a, of bottom guide rail 25.

With particular reference to FIGURES 5 and 6, the filler board 36 comprises a fluted flexible panel 84 capable of being rolled into a scroll housing 85 that extends the height of strap 42 and is retained by the screws 45 that extend through the end tabs 44 hereinbefore described. Housing 85 includes a slot 86 that is so aligned with upper groove 75 and lower groove 77 that panel 84 is retained in the grooves as it is caused to play out from scroll housing 85 as frame 27 is extended. Conversely, the panel 84 will roll-up within the scroll housing upon retraction of frame 27. To provide for automatic extension of panel 84 as frame 27 is extended, the panel includes a transversely extending flange 87 that is retained by bifurcations 91 and 92, formed in top and bottom guide rails 24 and 25, respectively. Bifurcations 91 and 92 urge a beaded portion 93 of flange 87 into sealing engagement with end wall 15 of housing 11. Vertical member 32 is sealed to window frame 21 by a gasket 50 extending the height of the member 32 and affixed to a suitably formed portion of scroll housing 85.

With further reference to FIGURES 3 and 6, top guide rail 24 is sealed to top wall 12 of cabinet 11 by a gasket 29, and attachment of the rail to the cabinet top wall is provided by screws, one of which is seen at 30. Bottom guide rail 25 is sealed to bottom wall 13 of cabinet 11 by a gasket 40, and attachment of the bottom guide rail to the cabinet is provided by a screw 48 that affixes tab 49 of the rail to side wall 15 of the cabinet.

The top rail 24 and upper leg portions 33 and 34 are sealed to window 23 by suitable gasket means which, while not shown, may readily be mounted in strip form along staggered overlapping portions of flanges 73 and 71 (see FIGURE 3). The room or inside edge of gasket 40 seals against window ledge 28 in such a manner that the room side edges of flange 81 of bottom leg portion 39 is sufficiently close to window ledge 28 to afford a satisfactory seal for this region.

Considering now the installation of the air conditioner in the window frame, the window sash 23 first is raised to provide a vertical opening slightly in excess of the overall height of the air conditioner 10. With the extension frames 26 and 27 fully retracted, air conditioner 10 is placed in the window opening with the center of cabinet 11 aligned with the center of window sill 12, and the room side edge of gasket 40 aligned with the rear edge of sill 12. Window sash 23 is then lowered so that it is behind flanges 73 and 71, following which extension frames 26 and 27, either simultaneously or separately, are extended. As frame 27 is extended, the rolled-up panel 36 unrolls from housing 85, with detent means 41 permitting such extension. As the frame is being extended locking channel 51 is maintained in its upper or retracted position as shown in FIGURES 4 and 7. As the frame is extended further, leg portion 52 engages the edge of window channel 22 (FIGURE 7) and locking channel 51 is thereby cammingly dislodged from its rest position, as provided by offset portions 57 and 61 engaging lugs 46 and 47, whereupon it gravitates diagonally until legs 52a frictionally engage a side of the window channel 22 (FIGURE 7A). Substantially simultaneously, the tabs 56 slide over the window frame and prevent further extension of the mounting means. Detent means 41, on the other hand, prevents retraction of the mounting frame.

This operation as explained above is duplicated for frame 26, and by virtue of the foregoing operations installation of the air conditioner is complete. No alteration of the window structure is necessary either before or after mounting the air conditioner.

It will be appreciated that the apparatus of the invention is such that housing 11 may be installed minus the air treating means, after which installation the latter means is inserted within the housing from the room side. Also, the mounting means is readily adaptable for mounting of a complete air conditioner structure comprising the housing and air treating means.

From the foregoing description it will be appreciated that the invention provides readily adjustable means for mounting a room air conditioner within a window opening, which means includes elements slidable from a retracted position into an extended window-frame engaging position, and is so constructed and arranged that engagement of the elements with the window frame actuates locking means to lock the mounting means both to the frame and in its fully extended position. The apparatus is also featured by the fact that extension of the mounting means to its locked position also automatically disposes means for sealing the openings located to either side of the housing between the latter and the window frame.

Still further, in the event the side openings are too small to accommodate the scroll housing 85, the latter may be removed prior to installation by loosening screws 45 to permit lateral removal of the housing. At the same time filler panel 84 is withdrawn from the housing and trimmed flush with the confronting face of the window frame 21.

While a preferred embodiment of the invention has been illustrated, it will be understood that such modifications are contemplated as fall within the scope of the appended claims.

I claim:

1. Mounting means for a room air conditioner of the type including a box-like housing adapted for placement within a window frame, said means comprising: generally rectangular bracket means for enclosing said housing and adapted for disposition within such window frame in substantially coplanar relation with the latter, said bracket means including portions mounted for telescoping movement from a retracted position to an extended mounting position engaging such window frame; and locking means for establishing such extended position and locking interengagement of said bracket means with such window frame in response to moving said bracket portions toward said frame said locking means comprising pawl means, means pivotally mounting said pawl means upon said bracket means, said pawl means continuously frictionally engaging said bracket portions and being operable to permit movements of said bracket portions to extended position while preventing their movement to retracted position, and means carried by said bracket portions automatically movable transversly of said frame into wedging engagement with said frame, thereby to establish the recited locking interengagement.

2. In air conditioning apparatus, means for mounting a room air conditioner housing within window frame structure having window channels, said housing including top, bottom, and vertical side walls, and means comprising: upper and lower guide rail means extending along said top and bottom walls, respectively, of said housing and adapted for disposition substantially in the plane of said window channels, each said upper and lower guide rail means including bifurcated tab means disposed adjacent vertical side walls of said housing and each presented toward the other; a pair of generally U-shaped frames each comprising leg portions slidable in said guide rail means from a retracted to an extended position, each said frame member including a vertical loop portion disposed for insertion into a window channel upon movement of said frame to an extended position; detent means resiliently actuatable to prevent movement of each said frame to a retracted position while permitting its movement to an extended portion; means for locking each frame loop portion in a window channel including cam actuated wedge means operative, in response to a camming engagement with a side wall of said window channel, to be projected into wedging engagement with said channel; a scroll housing extending vertically adjacent said loop portion and having a slot extending along a lateral portion thereof and presented toward said housing; and flexible panel closure means including flange means along a free vertical edge thereof, said flange means being clamped between said bifurcations and a vertical side wall of said housing and said closure means extending toward said scroll housing and into the lateral slot thereof, the construction and arrangement being such that when said frame members are moved to retracted position said flexible panel is rolled up for storage in said scroll housing, and when said frame members are moved to extended position said flexible panel is unrolled from said scroll housing.

3. Apparatus according to claim 2 and further characterized in that said leg portions of each said frame include grooves presented toward one another and aligned substantially in a plane with the slot to said scroll housing, said flexible panel being retained within said grooves.

4. A room air conditioner of the type including a box-like housing adapted for placement within a window frame including window channels, generally rectangular bracket means surrounding said housing and adapted for disposition within such window frame in substantially coplanar relation with the latter, said bracket means including mounting portions disposed for telescoping movement from a retracted position to an extended position engaging such window frame channels to mount said air conditioner, and locking means establishing such extended position and air conditioner mounting interengagement of said mounting portions with such window frame channels, said locking means comprising: pawl means; means pivotally mounting said pawl means upon said bracket means, said pawl means being operable to permit movements of said telescoping mounting portions to extended position while preventing movement thereof to retracted position; and cam actuatable means carried by said mounting portions and automatically movable into wedging engagement with said window frame channels, laterally of the plane thereof, upon extension of the said mounting portions into initial camming engagement with said window frame channels.

5. An air conditioner according to claim 4 and further including resilient force-producing means operable to urge said pawl means into continuous frictional holding engagement with said mounting portions of said bracket means, such holding engagement permitting the recited movements to extended position while preventing the recited movement to retracted position.

6. A room air conditioner according to claim 4 and characterized in that said cam actuatable means comprises a pair of lug members carried by each said mounting portion, and channel means having a web portion and a pair of vertically extending leg portions disposed at an angle as respects its web portion and presented for insertion into and wedging engagement with such window frame channels, said web portion including a pair of parallelly inclined grooves each slidable on a lug member diagonally to move said channel means from a rest position to the recited wedging engagement, upon the recited initial camming engagement followed by insertion of said leg portions into such window frame channel, and an offset detent portion in at least one of said grooves cooperable with a corresponding lug member to maintain said channel means in the recited rest position, said camming engagement of said leg portions with said window frame channels being operable to disengage said detent means and permit the recited movement of the channel means under the force of gravity.

7. In air conditioning apparatus, means for mounting a room air conditioner housing having top, bottom, and vertical side walls, within window frame structure having window channels, said means comprising: upper and lower guide rail means extending along said top and bottom walls, respectively, of said housing and adapted for disposition substantially in the plane of said window channel, the upper one of said guide rail means including an upwardly extending flange; a pair of generally U-shaped frames each comprising leg portions slidable in said guide rail means from a retracted to an extended position, each said frame further including a vertical loop portion disposed for insertion into a window channel upon movement of said frame to an extended position; detent means actuatable to prevent movement of each said frame to a retracted position while permitting its movement to an extended position, said detent means comprising a lever and means pivotally mounting the same at one end thereof upon said flange of said upper guide rail means, the other end of said lever including friction producing means engageable with a leg portion of one of said U-shaped frames, and spring means reacting between said lever and said rail means to urge said lever into continuous frictional engagement with said leg portion; and means for locking each said U-shaped frame loop portion in a window channel, said means for locking including cam actuated wedge means operative in response to camming engagement thereof with a side wall of said window channel, to be projected into locking wedging engagement with said channel.

8. In air conditioning apparatus, means for mounting a room air conditioner within window frame structure having vertically extending window channels, said means comprising: bracket means for said air conditioner and adapted for disposition within such window frame structure in substantially coplanar relation with the latter, said bracket means including substantially vertical portions mounted for telescoping movement from a retracted position to an extended air conditioner mounting position, and means for establishing locking interengagement of said vertical portions of said means with such window frame comprising: a pair of lug members, one disposed above the other and carried by said vertical portions of said bracket means; and channel means having a vertically extending web portion and a pair of vertically extending leg portions disposed at an angle as respects said web portion and presented for engagement with such window frame structure followed by insertion into such window frame channels for wedging engagement therewith, said web portion including a pair of parallelly inclined grooves each slidable on a lug member diagonally to move said channel means from an upper rest position to the recited wedging engagement, upon engagement of said leg portions with such window frame followed by insertion into such window frame channel, and an off-set detent portion in at least one of said grooves cooperable with the corresponding lug member to maintain said channel means in the recited upper rest position, said engagement with such window frame being operable laterally to displace said channel means thereby to disengage said detent means, and permit the recited subsequent wedging movement of the channel means under the force of gravity.

References Cited in the file of this patent

UNITED STATES PATENTS

| | | |
|---|---|---|
| 507,520 | Amos | Oct. 24, 1893 |
| 2,624,402 | Lukasavicz | Jan. 6, 1953 |
| 2,665,627 | Fager | Jan. 12, 1954 |
| 2,818,793 | Hord | Jan. 7, 1958 |
| 3,030,873 | Metcalfe | Apr. 24, 1962 |